United States Patent

[11] 3,616,389

| [72] | Inventors | Yoichiro Onishi;<br>Takashi Suetake, both of Amagasaki-shi, Japan |
|---|---|---|
| [21] | Appl. No. | 740,857 |
| [22] | Filed | June 28, 1968 |
| [45] | Patented | Oct. 26, 1971 |
| [73] | Assignee | Mitsubishi Denki Kabushiki Kaisha<br>Tokyo, Japan |
| [32] | Priority | June 28, 1967 |
| [33] | | Japan |
| [31] | | 42/41436 |

[54] PROCESS FOR PRODUCING ELECTROPHORETICALLY INSULATED CONDUCTORS AND COILS
6 Claims, No Drawings

[52] U.S. Cl. ........................................ 204/181,
117/62.1, 117/63, 117/232, 204/183
[51] Int. Cl. ........................................ B01k 5/00,
C23b 13/00
[50] Field of Search ........................................ 204/181;
117/232, 63, 62.1

[56] References Cited
UNITED STATES PATENTS

| 1,661,844 | 3/1928 | Miller............................ | 117/232 |
|---|---|---|---|
| 2,213,969 | 9/1940 | Ruben............................ | 204/181 |
| 2,561,982 | 7/1951 | Hanna et al.................... | 117/232 X |

FOREIGN PATENTS

| 482,548 | 3/1938 | Great Britain................ | 204/181 |

*Primary Examiner*—Daniel E. Wyman
*Assistant Examiner*—P. E. Konopka
*Attorney*—Sughrue, Rothwell, Mion, Zinn and Macpeak ABSTRACT: A method for manufacturing an insulated conductor comprising the steps of:
a. electrophoretically precipitating an insulator coating onto the surface of a conductor,
b. heating said coating until said coating is in a semisolidified state,
c. forming said conductor into a desired configuration, and
d. subsequently solidifying said coating by further heating.

PROCESS FOR PRODUCING ELECTROPHORETICALLY INSULATED CONDUCTORS AND COILS

BACKGROUND OF THE INVENTION

1. Field of the Invention

This invention relates to electrically precipitated conductors, and, more particularly, to a process for the production of electrophoretically precipitated insulation on conductors and the application thereof to the production of the coils and the like.

2. Description of the Prior Art

The demands for the insulation of coils or windings to be used in the electric machines or equipment are becoming ever stricter, with accompanying progress in insulation materials and their application techniques. For instance, as a result of the size reduction of electric machines and equipment, the insulation is placed under severe demands, such as utmost uniformity and reliability, highest resistivity against severe conditions, such as, high temperature, strong adhesion between conductors, as well as other materials, when they are used in high-speed rotating machines, especially at coil ends, and the need for maintaining balance of the characteristic features between the conductor insulator and the ground insulation materials. Besides these, the demands for savings in fabrication cost, economization of manpower and working time, and the automation of coiling and insulation processes are urgent.

For the above-described reasons, the primary object of the present invention is to provide a novel insulating method which can satisfy all of the above-described demands.

electric action, the precipitation is selectively carried out at the positions where the electrical resistance is comparatively low, in other words, where the formation of the coating is not enough. As a result, the ultimately obtained coating has an extremely uniform thickness, substantially free of pin-holes, and above all, a considerable thickness of the coating can be obtained by one precipitation process.

These features are particularly effective in the production of the insulated electric conductor or so-called magnet wire which is utilized, for instance, as enameled wire or the like. That is, the insulated electric conductor produced by this method has extremely uniform thickness, as described above, which enables one to keep the variation of thickness at a minimum value, and reliability is thereby increased. Also, from the feature of having minimum deviation in thickness, the average thickness can be made thinner than the conventional enameled wire with the minimum thickness maintained at a constant value. Also, the average thickness can be chosen to be a larger value with the maximum outside diameter maintained well within the maximum allowable limitations. The feature of substantial freedom from pin-holes is also remarkable, and since the formation of the coating is carried out by electric action, the control of the thickness of the coating is easily performed by the regulation of the electric action. Furthermore, the feature of obtaining the desired thickness of the coating in a single treatment can promote the production efficiency significantly in view of the fact that the conventional enameled wire has required five to 10 times of treatments to obtain about the same quality of the thickness.

A number of experiments were executed on electrophoretically coated insulating wires in respect to thickness and the existence of pin-holes, and the results obtained were as follows:

ELECTROPHORETICALLY COATED ENAMELED WIRE

| Wire dia. (mm.) | Class [1] | Minimum coating thickness (mm.) | | Maximum finished diameter (mm.) | | Number of pin-hole | |
|---|---|---|---|---|---|---|---|
| | | Standard value | Measured value | Standard value | Measured value | Standard value | Measured vaule |
| 1.0 | 0 | 0.036 | 0 046 | 1.133 | 1.102 | <2 | 0 |
| | 1 | 0.025 | 0.032 | 1.102 | 0.074 | <3 | 0 |

[1] "0" equivalent to triple build, "1" equivalent to heavy build, respectively of NEMA Standard.

ELECTROPHORETICALLY COATED RECTANGULAR WIRE
[Standard Thickness of Coating: 0.15 mm.]

| Standard finished size | Sample Number | | | | |
|---|---|---|---|---|---|
| | 1 | 2 | 3 | 4 | 5 |
| Thickness, 1.81±0.04 | 1.760 | 1.783 | 1.862 | 1.799 | 1.782 |
| Width, 3.11±0.04 | 3.099 | 3.095 | 3.129 | 3.132 | 3.112 |

Another object of the present invention is to provide a superior method which enables one to utilize electrophoretically coated conductors in actual electric machines and equipment as the magnet wire.

The recently developed electrophoretic coating method comprises the steps of dipping the material to be coated into a water soluble resin bath, or a water suspended or dispersed resin bath, together with an opposing electrode, applying a DC voltage between the material to be coated and the opposing electrode, with the material connected to the anode in the ordinary case, whereby the resin component in the bath is transported through the electrophoresis phenomenon to the anode side, and upon losing the electric charge to the anode, the resin component is precipitated on the material.

Since the characteristic feature of this electrophoretic precipitation method resides in effecting the precipitation by It will be apparent from these results that the wires according to the electrophoretic precipitation method have substantially uniform thickness and no pin-holes. Of course, the above indicated thicknesses of the coating were obtained by a single precipitation treatment.

The method according to this invention herein described was made possible only when the electrophoretically precipitated insulating wire of superior nature, as indicated above, could be obtained.

In general, for the winding of coils for electrical machines and equipment, the above-described enameled wire or rectangular enameled wire has been used. When the electrical machine employs individual wires which have to be dropped into slots, the required number of turns of the above-described enameled wire are wound directly into the slots of the stator core by a winding machine. Thereafter, the thus wound stator core is dipped into an insulation varnish tank for impregnation, pulled out and heat dried. These are the fundamental practices of the conventional insulation treatment of the coils. In such cases, the enamel coating of the enameled wires plays the role of the individual wire insulations and the varnish plays the role of fixing and solidifying these wires to themselves and also to other materials, so that the intrusion of moisture and dust into the coil is prevented. This fixing and solidifying characteristic is especially required in high speed rotating machines for the varnish employed at the coil end and the like. As another method for replacing the above-described varnish treatment, a type of self-bonding enameled wire is employed. For the purpose of eliminating the comparatively time consuming varnish treatment, on the outer surface of the coated layer of the enameled wire, an adhesive layer consisting of a thermoplastic or a solvent softenable resin is provided beforehand. After the winding of the coils is completed, the above-described thermoplastic adhesive layer is heat-treated, so that they are fused together with each other, or the solvent softening adhesive layer is further treated with solvent to soften the layer. The layer is subjected to heating and cooling treatments, so that the wires are fused together and solidified. In this way, an effect is obtained which is similar to the case where the conventional enameled wire is wound into coils and thereafter varnish treated. However, with this kind of enameled wire, there are drawbacks, such as, a specific process is required for coating the outermost layer, and the adhesive force is weakened at the operational temperature, if the adhesive layer consists of the thermoplastic resin.

SUMMARY OF THE INVENTION

This invention is intended to provide a novel method for producing self-bonding electrophoretically precipitated insulated wires and thereby forming and solidifying coils for electrical machines and equipment. This is accomplished first by electrophoretically precipitating a layer of resin on the surface of a bare conductor (of round or rectangular cross section) to the required thickness. In this case, the superiority of the water dispersion type resin has been widely recognized, because it enables one to obtain the ultimately solidified thickness of the coating, for instance, 0.03 to 0.5 mm., equivalent to the thickness of the insulating layers between the conductors or each turn of the conductors, and also to obtain the required electromechanical characteristics for the coating. Solidification of this resin is carried out first by adding a solvent which is partly or totally water soluble, such as N,N'-dimethylformamide, dimethylacetamide, and the like when it is required. The solidification enters into the ultimate stage through a low temperature solidifying process, if necessary.

According to the present invention, the above-described solidification is stopped once before the coating is ultimately solidified (hereinafter called semisolidified state), and wound into coils of the electrical machines. In other words, the coils are formed in a condition wherein the coil conductors having the above-described semisolidified insulation coating are contacting each other. It should be noticed that the degree of solidification is advanced to the extent that no obstacles, such as, scarring or deformation of the coating occur during the winding process, and also that the extent of solidification may be varied depending on the kind of the conductor, shape of the coil, method of the winding, and other circumferential conditions. Then, the above-described solvent is used to treat the thus formed coils, when required. This treatment may be accomplished by dipping the coils into the solvent or by placing the wire between two solvent immersed felt cloths during the formation of the coils. This solvent acts on the surfaces of the coils and increases the adhesion of the semisolidified insulation coating, and for this reason it is profitable to use the same kind of solvent as was employed in the above-described precipitation solvent. The amount of the solvent to be added should be limited to the extent that it just diffuses into the surface portion of the coating. The amount may be changed by the conditions, such as, the degree of the semisolidification and other solidifying conditions following the addition of the solvent. However, in any cases, at least the portion near the surface of the coating is kept in a not yet solidified state, whereby the coil conductors may be easily adhered to each other through these layers. Heating for solidification may be carried out either by a conventional heating furnace or by energizing the coils through the application of electrical current. Otherwise, a mechanical pressure may be applied together with the heating measure and the adhesive force between the coil conductors may be thereby enhanced. This method can be undertaken, for instance, when the rectangular section conductors are formed into stator coils or when the same conductors are formed into edgewisely wound field coils. In this way, these coils can be formed and solidified with allowable precision into the required ultimate dimensions.

In the random wound machine coils where each conductor is directly wound into slots of the machine cores, so-called slot insulation is provided in each slot to afford insulation against grounding of the coils. For this slot insulation, various kinds of sheet-formed insulating materials, such as, polyester-paper, a combined laminated paper referred to as "Mylar combination" have been employed. Recently, other methods utilizing epoxide resin powder or polyester resin powder have been developed, wherein these powders are applied directly onto the inside surface of the core slots by way of vibration coating or powder spray coating method.

The precipitation of coating on an electrically conductive body which is employed in the present invention can also be used for such slot surfaces, and by this way the slot insulation can be formed as already has been known.

The self-bonding electrophoretically coated conductor according to the present invention can also be wound on the cores which have slot insulation resin layers having been precipitated and solidified in a similar manner as described before. In this case, if the solidification of the slot insulation layer is suitably selected, the adhesion between the layer and the conductor coating, which constitutes a principal feature of the present invention, can be enhanced and the conductor insulation can be solidified integrally with the slot insulation.

Since the coil windings so formed as described above have now been sufficiently solidified, none of the usual varnishing treatments is required. However, if it is required, further application of varnish in the conventional manner is also possible, and in such case, for the purpose of ground insulation, a required number of tape winding is carried out on each of the coils, for instance, after the conductor coating and its solidification treatment have been completed as described above.

Also, as a modification of the present invention, it is possible to add a small amount of varnish to the solvent in which the already formed coils are dipped, as described before, or which is added while the coils were formed. When the core is dipped into the varnish solvent mixture, the surface of the core can be coated by the varnish enabling to be rendered in corrosion proof, and other insulating materials, such as, tape and/or fibers can be impregnated by the varnish, whereby the moisture proof nature of these materials can be promoted.

DETAILED DESCRIPTION OF THE INVENTION

Next, the various examples by which the results of the above-descirbed process are illustrated and verified will now be explained.

Example 1

Two pieces of specimen were prepared wherein soft rectangular copper bar (2 mm.×9 mm.) was dipped into a water dispersion type varnish bath, a DC voltage was applied between this conductor and a cathode opposingly disposed thereto for electrophoretically precipitating on the conductor a resin coating. Thereafter N,N'-dimethylformamide was applied to the thus precipitated coating and the coating was cured to obtain semisolidification. The two specimens were further dipped into N,N'-dimethyl formamide and then were put together in an overlapping relation of about 20 mm. and ultimately were solidified by maintaining the samples at 150° C. for 4 hours. Thus obtained samples were subject to dielectric testings and a shearing strength test. The preparation conditions and the test results are indicated in the following table.

TABLE 1

|  | Sample Number | | | |
|---|---|---|---|---|
|  | 1 | 2 | 3 | 4 |
| Semi-solidification temperature (° C.) | 80 | 80 | 80 | 80 |
| Semi-solidification time period (min.) | 60 | 20 | 20 | 10 |
| DMF* re-dipping period (min.) |  | 10 | 3 |  |
| Compression for ultimate solidification (g./cm.²) | 700 | 400 |  |  |
| Shearing strength (kg./cm.²) | 26.8 | 54 | 72.2 |  |
| Breakdown voltage (kv.) | 12.5 | 8.0 | 11.5 | 1.8 |

*Herein DMF means N,N'-dimethylformamide.

Example 2

Resin coating was electrophoretically precipitated on a soft copper wire of 1 mm. diameter to a thickness which, after solidification, corresponded to the thickness of Class 0, equivalent to triple build, and the thus obtained coating was thereafter semisolidified. The sample prepared in this way was then subjected to an adhesion test, and a high-voltage breakdown test. The former test was performed in accordance with those proposed by Mr. Straker (see U.S.A. Technical magazine INSULATION Oct. issue, 1964, pp. 41 et seq.), and the latter test was carried out as specified in JISC3203 "Polyvinyl Formal Enameled Wire" Two Conductor Twist Pair Cord Test. The sample was, after semisolidification, bundled or twisted together and with or without addition of the solvent, the sample was ultimately solidified. Preparation conditions and test results are indicated in the following table.

TABLE 2

|  | Sample Number | | | | | | | Ref. 1[1] | Ref. 2[2] |
|---|---|---|---|---|---|---|---|---|---|
|  | 1 | 2 | 3 | 4 | 5 | 6 | 7 | | |
| Semi-solidification condition [3] | A | A | B | B | A | A | A | | |
| Solvent dipping, (min.) |  | 3 | 1 | 3 | 1 | 1 | 1 | | |
| Adhesion, (kg.): | | | | | | | | | |
| At room temp | 10.7 | 16 | 16 | 18 |  |  |  | 20 | 20 |
| At 50° C |  |  |  |  |  |  |  |  |  |
| At 100° C |  |  |  |  | 15.3 |  |  |  |  |
| At 150° C |  |  |  |  |  | 14.6 |  | 5 | 17 |
| Breakdown voltage (kv.) | 6.7 |  | 10.3 |  | 6.4 |  | 10.7 | 2 | 10 |

[1] Conventional enameled wire is used and processed by phenolic varnish.
[2] Conventional enameled wire is used and processed by modified phenolic varnish.
[3] The degree of semi-solidification for B is more advanced than A.

As was described, the present invention has been put to practice only by the utilization of the electrophoretically precipitated conductor or wire which has been provided with a uniform coating of required thickness by a single process of precipitation. Conventional enameled wire or conductors has undergone five to 10 times the number of coating and baking processes before the required uniform thickness is obtained, and after each process, the coating was ultimately solidified. As a result, it was impossible to obtain an adhesive force such as described above merely by the application of solvent on the outer surface. For this reason, in the past, the self-bonding type insulation wire utilized for a similar purpose was applied by a specific layer consisting of a thermoplastic resin or a solvent addition adhesive resin on the outer surface of the enamel coating for the purpose of increasing the adhesion. However, the additional application of the specific layer inevitably caused an increase in processing time and the deterioration of the adhesive force at high temperatures. Since this type of insulation wire has an adhesive layer consisting of a material dissimilar to the material of the insulation coating, it was not possible to accomplish the object of obtaining completely unified insulation.

According to the present invention, the adhesive layer is made of a similar resin as that of the insulation coating. If the ground insulation is also formed in accordance with this invention from a similar resin, an ideally unified and integrated insulation system can be obtained. This fact amplifies the advantageous features of the electrophoretic coated insulated wires.

Furthermore, according to the present invention, not only can the production process of the insulated wire be minimized, the varnish treatment subsequent to the winding process is eliminated, and the economization of the insulation processes can be thereby attained. Besides the above merits, according to the present invention, a continuous production from bare copper conductor to coils has been made possible.

Although the present invention has been described in respect of its applications and treating conditions, it will be apparent to those skilled in the art that many other modifications can be obtained without departing from the spirit of this invention as defined in the following claims:

What is claimed is:

1. A method for manufacturing an insulated conductor comprising the steps of:
   a. electrophoretically precipitating an insulating coating from a water dispersion of a resin varnish onto the surface of a conductor,
   b. heating said coating until said coating is in a semisolidified state,
   c. forming said conductor into a desired configuration, and
   d. subsequently solidifying said coating by further heating.

2. The method according to claim 1, wherein two adjacent coated conductors or conductor portions are brought together while said coatings are in a semisolidified state until the regions of the respective coatings are in such contact that said conductors or conductor portions are bonded together, when the coatings are solidified by subsequent heating.

3. The method according to claim 1 wherein subsequent to said precipitation said coating is subjected to the action of a water-soluble solvent prior to formation of said semisolidified state.

4. The method according to claim 3, wherein said water-soluble solvent is a member selected from the group consisting of N,N'-dimethylformamide and N,N'-dimethylacetamide.

5. The method according to claim 3, wherein a further application of said solvent is carried out after said coatings are brought into contact so that the adhesion of said bonded portions is increased.

6. The method according to claim 3, wherein said conductors or conductor portions are urged together during the subsequent and final solidification procedure of said coating.